May 15, 1962  W. K. SCHWEITZER, JR., ET AL  3,035,033
MOLDING GRADE COPOLYMERS AND PROCESS FOR PREPARING THE SAME
Filed Dec. 12, 1957

INVENTORS.
William K. Schweitzer, Jr.
Robert E. Lee
Clifford Jones, Sr.
BY Griswold & Burdick
ATTORNEYS United States Patent Office 3,035,033
Patented May 15, 1962

3,035,033
MOLDING GRADE COPOLYMERS AND PROCESS FOR PREPARING THE SAME
William Kenmore Schweitzer, Jr., and Robert Edward Lee, Midland, Clifford Jones, Sr., Linwood, and John Lester Lang, Midland, Mich., assignors to The Dow Chemical Company, Midland, Mich., a corporation of Delaware
Filed Dec. 12, 1957, Ser. No. 702,376
8 Claims. (Cl. 260—88.1)

This invention relates to improved thermoplastic copolymers useful in thermal molding procedures. More particularly it relates to such copolymers exhibiting improved physical properties. The invention additionally contemplates the process by which these copolymers are prepared.

Polystyrene and other homopolymers of monovinyl aromatic monomers are among the most widely used materials in preparing articles by thermal molding operations. The articles so prepared are characterized by exceptional properties that make the articles well adapted for a wide variety of uses. However, those homopolymers are not without disadvantages. One of the principal disadvantages involves the rheological properties of the polymers. In order to obtain the requisite tensile and impact strength, elongation, and similar properties, of a minimum for general acceptability it has been necessary to employ a polymer of certain minimum average molecular weight. When it is desired to obtain enhanced properties in the polymer product, it is then necessary to increase its average molecular weight. However, as the average molecular weight of such homopolymers is increased, the temperatures and/or pressures required for thermal fabrication are, accordingly, proportionately increased. Thus, in preparing such homopolymers it has always been necessary to reach a compromise in the molecular weight between that which gives optimum physical properties of the copolymer and that which permits the most convenient fabrication temperatures and pressures.

In order to circumvent such problems, attempts have been made to copolymerize styrene with a wide variety of comonomers, such as butadiene, acrylonitrile, alkyl acrylates, and the like, to modify some property of homopolystyrene or for some other reason. None of those copolymer products so obtained, however, has overcome the difficulties due to the physical properties-fabrication temperature contradiction which is believed to be caused by the rheological properties inherent in the linear or branched copolymer products generally obtained by conventional procedures. Copolymerization also introduces other vexatious complications. For example, the products of conventional copolymerizations are generally obtained as conglomerations, mixtures, or blends of compositional variants resulting from the differences in copolymerizability of various monomers. The substituents attached to the terminal carbon atoms of the olefinic unsaturation determine to a great extent the ability of a particular monomer to polymerize or to copolymerize. They also influence the rate at which a particular monomer will copolymerize with another. Thus, when two different monomers are intermixed and caused to copolymerize, one of the monomers will ordinarily be found to have greater polymerizability. As a consequence, the more polymerizable monomer in a mixture of monomers may polymerize with itself in the initial portion of the reaction to form a homopolymer until its concentration in the reaction mass has dropped appreciably. Only then will the less polymerizable monomer be able to actually copolymerize with the faster monomer. The actual copolymerization further depletes the relative concentration of the faster monomer and proceeds only for the limited time until the point is reached where substantially only the homopolymer of the slower monomer is capable of being formed. The result is a polymeric mixture of homopolymers and copolymers. As can be readily appreciated, the makeup of the conglomeration will usually be found to vary with the initial ratio of monomers present in the reaction mass, the conditions of polymerization, the purity of starting materials, and many other factors that will be apparent to those skilled in the art. Reproducibility of the conglomeration from batch to batch is very difficult, if not entirely impossible. It is frequently necessary to blend batches of such inconsistent polymers to provide products having the desired properties. Such techniques, of course, are costly and time consuming.

Many of the prior attempts to minimize compositional heterogeneity of copolymerization products have involved continuous polymerization processes. In most of those processes, it has been attempted to adjust the feed stock to that which would give a particular copolymer product desired. While suitable products can be made by following the prior processes, such processes, almost without exception involve delicate control and, despite meticulous execution, still leave room for considerable improvement in compositional heterogeneity. Thus, it would be desirable to have a process which would provide compositional homogeneity and easy control of copolymerization.

Among the copolymers which have appeared to have unique properties for use in molding are those of the vinyl aromatic monomers, such as styrene, with the alpha-beta unsaturated carboxylic acids, such as acrylic and methacrylic acids. Even when prepared by the conventional batchwise processes, the copolymers exhibit improved physical properties, such as increased heat distortion temperatures over either of the homopolymers. However, the monomers involved in the preparation of such products result in so much heterogeneity in the product that it is difficult to reproduce the properties of the product from batch to batch. Also, in the batchwise processes, the copolymers tended to cross-link at high conversions. When the copolymers are prepared by the aforementioned continuous processes, the properties of the resulting product are somewhat improved, but the copolymers tend to exhibit a thermal instability, as evidenced by a progressive decrease in melt viscosity upon continuous exposure to elevated temperatures. Significant evidence that the heretofore available processes result in heterogeneous compositions resides in the appearance of molded sections prepared from the copolymer products of such processes. Such sections are usually translucent or opaque. Thus, it would be particularly desirable to have an improved process for preparing styrene-acrylic and the like copolymers, so that their full potential as molding materials could be easily realized and readily achieved.

The provision of an improved continuous polymerization process for mixtures of copolymerizable monomers is the principal object of this invention.

It is a further object to provide such a process for preparing copolymer products of improved compositional homogeneity.

It is a still further object to provide such a process for preparing copolymer products of improved thermal stability and clarity.

Another object is the provision of a facile process for preparing molding grade copolymer products of premium quality.

Still another object is to provide an improved class of copolymers from vinyl aromatic monomers and acrylic comonomers which exhibit the aforementioned improved properties and characteristics.

The above and related objects are accomplished by means of the process of the present invention wherein a homogeneous monomeric material consisting essentially of a vinyl aromatic monomer and an acrylic monomer is prepared and heated together with not more than about 60 percent of the copolymer product resulting therefrom at an elevated temperature while maintaining the proportions of said monomeric material and said copolymer product substantially constant by feeding additional amounts of said monomeric material to the mixture at substantially the same rate at which it is polymerized while withdrawing said copolymer product at about the same rate at which said monomeric material is fed to the mixture, all of said steps being conducted in the substantial absence of iron.

The copolymers contemplated by the invention are those containing recurring units of polymerized monovinyl aromatic monomers of the benzene series and also containing in the same copolymer chain recurring units of copolymerized acrylic monomers. Among the monovinyl aromatic monomers, styrene is preferred. However, other monomeric alkenyl aromatic compounds, such as para-methyl styrene, meta-ethyl styrene, ortho-para-dimethyl styrene, ortho-para-diethyl styrene, para-chlorostyrene, isopropyl styrene, ortho-methyl-para-isopropyl styrene or ortho-para-dichlorostyrene, or comonomeric mixtures of styrene with alpha-methyl styrene or of styrene with any of the above-named compounds may also be used. Thus, the term "monovinyl aromatic monomer" as used herein is intended to include the compounds having a vinyl radical directly attached to a carbon atom of an aromatic nucleus.

By arcylic monomer it is meant to include acrylic acid and methacrylic acid. The acrylate esters, such as the alkyl acrylates when used as the sole acrylic monomer, do not provide the outstanding properties desired herein. However, small amounts of alkyl acrylates and alkyl methacrylates may be used if desired to form a terpolymer. It has also been found that crotonic acid and itaconic acid are generally not satisfactorily operable in the process for the primary reason that each is insoluble in the monovinyl aromatic monomer. Solubility is a prerequisite for successful operation, since only when such condition is achieved is it possible to achieve a homogeneous monomeric material and consequently the desired polymer products.

Excellent molding grade copolymers can be manufactured by the present process when the monovinyl aromatic monomer is employed in the homogeneous monomeric material in a concentration of from about 70 to about 99 percent of the total weight of monomeric material with the remainder being made up of the acrylic monomer. There is no significant advance in copolymeric properties when the base polymer is composed of less than about one percent of acrylic monomer. Copolymers composed of appreciably more than about 30 percent of acrylic monomer are difficult and expensive to prepare, have a significantly reduced polymerization rate, and are so cross-linked as to be of little utility as molding materials. Any advantage obtained from such copolymers by way of their inherent properties is not proportional to that obtained when smaller amounts of acrylic monomer are used. In addition such advantage, even when achieved, seems to be off-set by an undesirable reduction in some other property of the product, and by the increased corrosive tendencies of the monomers, which increase the difficulties incurred in successfully accomplishing the polymerization.

The copolymers of this invention are made by heating a homogeneous mixture of the monomeric material and the copolymeric product thereof in bulk, i.e., in the substantial absence of other polymerizable substances, soluble diluents or insoluble dispersants, or in the presence of small amounts of solvents for the polymer at a pressure sufficient to preserve the liquid state. The polymerization temperature is maintained between about 130° C. and about 160° C. The monomeric materials are fed into said mixture at a rate and in a proportion such as to maintain in said mixture a constant equilibrium ratio of the monomeric materials to each other and to maintain the proportion of copolymer in the mixture constant at not more than about 60 percent by weight.

These conditions are readily attained by feeding continuously, and at steady rates, the copolymerizable monomeric materials to the polymerizing system in a polymerization zone which is maintained within the indicated range of temperature while continuously withdrawing from said polymerization zone a portion of the polymerizing system or polymerization mass at a rate corresponding to the volumetric feed rate of monomeric materials. When equilibrium is attained in such a system, the ratio of monomeric materials to one another in the polymerization zone, the concentration of polymer in the polymerizing system, and the chemical composition of the copolymer product are generally found to be substantially constant. It should be apparent that the relative proportions in which the monomeric materials are chemically combined in the copolymer are not necessarily the same as the relative proportions of the monomeric materials in the homogeneous mixture from which the copolymer was formed. The proportions of monomeric materials which are necessary in a feed mixture in order to produce a copolymer having a particular empirical structure may be determined from the pertinent reactivity ratios or, if such ratios are not available, the suitable proportions may be found by simple preliminary tests. As a practical matter, once the equilibrium has been established, it is most conveniently continued by maintaining a heat balance on the system through adjustment of the feed rates of monomeric material and rate of withdrawal of the mixture of copolymer product and unpolymerized monomers.

For successful operation of the process, it is essential that all steps up to the withdrawal of the portion of the polymerizing system be conducted in the substantial absence of iron. Best results are obtained when all iron is effectively excluded from the polymerization system. Thus the use of apparatus constructed of ordinary iron and steel is prohibited. Elemental or ionic iron even in a concentration of 10 parts per million or less has such a retardant effect on the rate of polymerization as to preclude acceptable polymerization rates. Even the common stainless steels, when used as materials of construction, retard the rate of polymerization somewhat, although not prohibitively. A further disadvantage of the presence of iron is the discoloration of the resultant copolymeric product and also the increase in the thermal instability of the product. For the latter reasons it is preferred to exclude iron from all steps of the process including those relating to withdrawal of the copolymeric product and subsequent processing steps, such as devolatilization, grinding and the like. Materials of construction, such as non-ferrous alloys, nickel, glass-lined steel, and the like, are well-adapted for use in carrying out the process and, when so carried out, the copolymeric product has maximum and reproducible properties.

When operating in accordance with the process of this invention at the expressed temperature range of from about 130° C. to 160° C., it has been found that the pressures encountered are in the range of from about 25 to 75 pounds per square inch gauge. Those pressures will maintain the monomeric materials in the liquid state.

Because the process operates under equilibrium conditions, it is preferred to conduct it so that the polymerization system continuously contains less than about 60 percent of solids. By 60 percent or less solids content in the polymerization system is meant that the polymerization mixture or mass contains not more than 60 percent by weight of copolymer product. When the process is operated such that the polymerization system contains substantially more than 60 percent solids, the desirable conditions of equilibrium are found to be more difficult to achieve and maintain and the copolymer product is less subject to precise control. Additionally, when higher solids concentrations are involved, practical problems such as uniform heat transfer and pumping of the viscous polymerizing system, become quite serious. Although solids of less than 60 percent may be utilized as the equilibrium, the full potential capacity of the apparatus is not realized and the subsequent devolatilization is prolonged. In order to maintain an equilibrium it follows that the percent solids at any moment will be greater than the percent conversion of monomer to polymer. In practice, it is preferred to adjust the rates of feed and withdrawal so as to operate at very low conversions of about 1 to 5 percent or less. That results in greater compositional homogeneity.

Although minor amounts of the usual free radical polymerization catalysts may be employed in the process, they are not essential to its successful operation. Accordingly, it is preferred to operate without any added catalyst. As will be later described, however, catalysts may be employed in adjusting the process to provide the copolymer products having the desired viscosity.

The copolymer product can be isolated from the unpolymerized components of the polymerization mixtures by any of the known methods, such as by precipitation in a non-solvent or by devolatilization. It is preferred to devolatilize the mixture mechanically by heating the mixture under reduced pressure whereby the volatile unpolymerized components are vaporized leaving the copolymer product as a residue. If immediate devolatilization is impractical upon withdrawal of the mixture from the polymerization zone, the mixture may advantageously be chilled to stop or to retard subsequent polymerization to the greatest possible extent. If polymerization is allowed to continue beyond withdrawal of the polymerization system from the polymerization zone, it generally does not proceed according to and under the necessary conditions of the present process but will ordinarily follow the usual batchwise polymerization mechanism and kinetics. The results in such instances will effectively be a blend of the desired copolymeric product of this invention and of the conventional batch-polymerized product. Such a blend is, of course, likely to be obtained with the aforementioned disadvantages of compositional heterogeneity, thermal instability, translucence, gels due to cross-linking, and others. As a generally inflexible rule, only the products resulting from the present process are found to exhibit the indicated desirable properties.

To afford further illustration, a preferred embodiment of an apparatus which is well-adapted for the manipulative steps of the process will be described. It should be understood that the invention is not limited to any particular apparatus and that known mechanical equivalents may be substituted in the preferred embodiment without departing from the spirit and scope of the invention. In the drawings.

Figure 1:
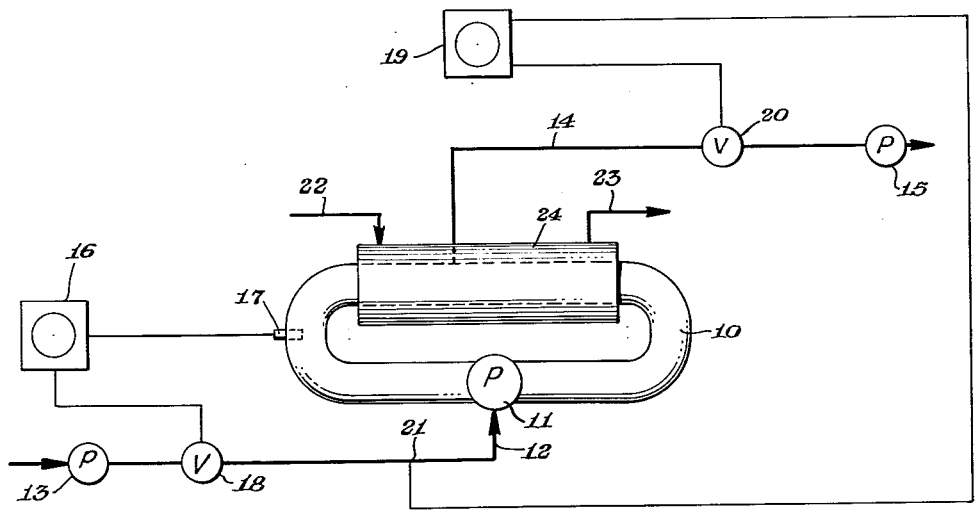
FIG. 1 is a schematic plan of the apparatus.

In the preferred embodiment there is provided a loop 10 of pipe forming a torus, hereinafter referred to as coil 10. A recirculating pump is provided in the coil 10 to recirculate the polymerizing mixture through the coil. An inlet pipe 12 is attached to the coil 10, preferably near the recirculating pump 11. The pipe 12 causes dispersion of monomeric materials within the polymerizing system as rapidly as possible so as to maintain the polymerization equilibrium. Fitted into inlet pipe 12 is a metering pump 13 for metering a homogeneous monomeric material into the coil 10. The inlet pipe 12 is connected to conventional inventory tanks (not shown). At a point on the coil 10 remote from the inlet pipe 12 is an outlet pipe 14 for withdrawing a portion of the polymerization system. Fitted into the outlet pipe 14 is a metering pump 15 for withdrawing a metered portion of the polymerizing materials. The outlet pipe 14 is connected to a conventional devolatilizer such as that described in U.S. 2,804,920 issued September 3, 1957, to C. C. Perkins or other similar devolatilizing apparatus (not shown) which is adapted for handling viscous fluids.

A temperature regulating control 16 is installed in the system. A thermocouple 17 is inserted in a well in coil 10 and connected to control 16. A valve 18 is fitted into inlet line 12 between metering pump 13 and coil 10. The control is adjusted so that an increase of temperature within the coil 10 will open the valve 18 and cause more monomer to be introduced into the polymerizing system.

A pressure regulating control 19 is also inserted into the system. Connected to the control 19 is a valve 20 which is fitted into the outlet line 14 between the coil 10 and the metering pump 15. The control 19 is also connected to inlet line 12 at the point designated by the numeral 21. The control 19 is adjusted so that an increase in pressure in the inlet line 12 will open the valve 20. This causes a portion of the polymerizing system to be withdrawn.

The use of the temperature regulating control 16 and the pressure regulating control 19 permits the process to be subject to automatic control. Once the coil 10 is hydrostatically filled and equilibrium has been established, a slight increase in temperature within the coil 10, as may be caused by the exothermic polymerization reaction, opens the valve 18. In this way, fresh, relatively cold monomer is automatically introduced to the polymerization system to lower its temperature. Simultaneously, the valve 20 opens to allow the discharge of an equal volume of monomer-copolymer mixture.

If desired a part of the coil 10 may have a jacket 24 through which heat exchanging fluids may be passed by means of inlet 22 and outlet 23. Such means allows the polymerization to be controlled at any desired solids.

The copolymer products produced in accordance with the present process are thermoplastic and capable of being formed by conventional thermal fabrication methods, such as compression and injection molding, into useful articles of manufacture. The products exhibit improved properties, particularly with regard to thermal stability and to the transparency of the molded articles over the copolymers and products of similar monomer composition but prepared by prior processes. In addition, the copolymers of this invention are free of gels and the like which are commonly present when a copolymer is partially cross-linked, highly branched, or of highly heterogeneous composition. The lack of such defects is of paramount importance in achieving commercially successful moldings, particularly transparent moldings. Still further, the improved properties of the copolymer products obtained by practice of the present invention are more easily and consistently reproducible than when the prior processes are employed for their preparation.

It is believed that the aforementioned improvements in the copolymeric product are the result of a more regular and uniform molecular architecture of the copolymer than that of copolymers prepared by the prior known processes. In the prior processes the resulting polymeric products had highly irregular, non-uniform, heterogeneous architecture which depended upon the amount of premixing of the monomers and the relative chemical reactivities of the monomers. In the process of this invention, however, it is believed that there are produced copolymers whose architecture very closely resembles the theoretical recurring groups that could be drawn from an examination of the starting monomeric mixtures.

Because of the molecular architecture, the copolymer products obtainable by practice of the present invention generally exhibit a rheological behavior which is exceptionally well-adapted for thermal fabrication. It is believed that the carboxylic groups are capable of such an alignment or orientation that they hydrogen bond with one another. Thus, at ordinary temperatures, the copolymers exhibit strengths approaching those of copolymers which are cross-linked by primary valence bonds. However, at elevated temperatures the copolymers of the present invention exhibit the fluidity or plasticity which is usually associated with linear polymers. As a result, they can be easily formed or shaped into practically any desired article. Upon cooling from an elevated temperature, the "pseudo-cross-linking" of the present copolymers caused by the hydrogen bonding is generally observed to recur. This behavior likewise results in higher heat distortion temperature for the copolymers. However, although the heat distortion temperature is increased appreciably, there is only a slight elevation of the temperature required to fabricate the copolymers thermally. This behavior is in contrast to the prior experience in the polymerization art, where a modification which would cause an increase in the heat distortion temperature would necessarily result in a proportional increase in the fabrication temperature. This effect is of readily apparent commercial significance.

For use in molding applications the copolymers should have a solution viscosity of from 4 to 20 centipoises, and preferably from 5 to 10 centipoises, as measured from a 10 percent by weight solution of copolymer in methyl ethyl ketone at room temperature. The solution viscosity is a parameter of the molecular weight for any given copolymer wherein the polymer chains are of similar spatial configuration. By that is meant that all the chains are linear or branched or cross-linked. Thus, for a given copolymer an increase in solution viscosity indicates an increase in molecular weight. In any molding operation there must be a compromise between the physical properties of the molded article and the melt viscosity of the polymer from which the article is molded. Both the physical properties and the melt viscosity are dependent, in the case of linear polymers, upon the molecular weight of the polymer. The above-stated range of solution viscosities provides copolymers having the optimum properties and workability and is accordingly preferred. The desired range is attained by operating within the aforementioned temperature range of from about 130° C. to 160° C. Within the expressed range it may be desirable to employ minor amounts of the conventional free radical catalysts to achieve the desired viscosity at the temperature which gives optimum polymerization rates.

Although the copolymer products of the present invention may, per se, be formed into useful molded articles, it is most common in the polymer art to employ formulations consisting of many ingredients. Thus, the copolymers may be dyed, pigmented, filled, plasticized or formulated in any conventional or desired manner.

The following examples are offered for purposes of illustrating and exemplifying the operation of the process and advantages of the copolymers. In the examples, all parts and percentages are by weight.

*Example 1*

A polymerization reactor was constructed from a loop of coiled standard 1 inch pipe about 100 inches in length. The ends of the pipe were connected to a pump for rapidly circulating the contents of the coil. Means were provided for continuously feeding, at a measured uniform rate, a homogeneous mixture of liquid monomeric materials. Means were also provided for maintaining the temperature of the coil at a temperature of from about 130° C. to about 160° C. At a point in the coil remote from the point of introduction of the feed mixture there was provided means for continuously withdrawing a portion of the polymerization mixture at the same rate as the rate of feed into the coil and under conditions that the contents of the coil were maintained in the liquid state. The withdrawn portion of the polymerization mixture was fed into a devolatilizer where the mixture was heated under reduced pressure and the unpolymerized monomers vaporized leaving the copolymer product as a residue containing approximately 1 percent of volatile material.

Using the above apparatus, copolymers were prepared from styrene and both acrylic acid and methacrylic acid in various compositional ratios. The temperature of the coil was maintained throughout each of the polymerizations at 145° C. The monomers were first intermixed, then fed into the coil, wherein they were allowed to polymerize to about 50 percent conversion, after which a portion of the copolymer-monomer mixture was continuously withdrawn at the same rate at which the monomers were being introduced. After equilibrium was established, the withdrawn polymer-monomer portions were devolatilized. The following results were obtained.

| Monomer Feed (styrene/acrylic) | Polymer Composition [1] (styrene/acrylic) | Percent Volatiles After Devolatilization | Solution Viscosity [2] (cps.) | Melt Viscosity at 440° F. |
|---|---|---|---|---|
| 95/5 acrylic acid | 91/8.5 acrylic acid | 0.75 | 8.3 | 4,180 |
| 90/10 methacrylic acid | 82/18 methacrylic acid | 0.40 | 7.7 | 10,760 |
| 85/15 methacrylic acid | 78/22 methacrylic acid | 1.25 | 8.3 | 13,000 |

[1] Polymer composition determined by titration with alcoholic NaOH.
[2] Viscosity of 10 percent of copolymer in methyl ethyl ketone at 25° C.

Each of the samples was compression molded into a specimen of a thickness of about 0.1 inch. In each instance the molding was completely transparent and without any discernible discoloration. When feed stocks were employed containing greater than 30 percent by weight of acrylic acid or of methacrylic acid, the resulting products were so cross-linked that the solution viscosities were impossible to obtain. Those compolymers could not be molded into clear gel-free moldings.

By way of contrast the same feed stocks were placed in tubes, allowed to polymerize batchwise to about 50 percent conversion, and subsequently devolatilized. The samples were molded under the same conditions and the molded specimens found to be translucent to opaque.

By way of further contrast the monomers were polymerized to completion under conventional mass polymerization conditions. The samples were highly cross-linked, as evidenced by a large number of gels being observed in them when they were molded as well as when they were dissolved in methyl ethyl ketone.

*Example 2*

Several copolymers were prepared using the continuous polymerization apparatus described in Example 1. By varying the temperature of polymerization from about 100° C. to about 170° C. copolymers resulted having solution viscosities in the range of from 4 to 20 centipoises as measured at 25° C. from a 10 percent solution in methyl ethyl ketone, as well as copolymers outside of that solution viscosity range.

These copolymer products, having solution viscosities higher than 20 centipoises, required such high temperatures and pressures for their fabrication as to preclude their use in conventional thermal fabricating equipment. Those copolymers having solution viscosities of less than 4 centipoises molded easily. However, molded sections prepared from them had very poor tensile strengths and were noticeably inferior in other of their physical properties.

The copolymer products falling within the range of solution viscosities of from 4 to 20 centipoises were easily molded into clear sections having good physical properties.

Example 3

Using the continuous polymerization apparatus described in Example 1, a monomer feed of 90 parts styrene and 10 parts acrylic acid was polymerized by the method therein described. After devolatilization to about a 1 percent volatiles content, the sample was heated to 280° C. for 75 minutes. At intervals the melt viscosity of the polymer product was determined. After about 15 minutes, the melt viscosity of the product was found to drop at a rate of about 23 percent per hour.

By way of contrast the same monomers were copolymerized under conventional mass polymerization conditions to about 50 percent conversion. After devolatilization, the product was exposed to the identical conditions as above described. In this instance, the melt viscosity was found to drop at the rate of 35 percent per hour. This indicated that considerably less thermal stability was obtained than had been achieved in the product prepared in accordance with this invention.

Example 4

Several attempts were made to repeat the process of Example 1 using iron pumps in place of the stainless steel pumps. In most instances no polymerization was initiated. In the few runs where polymerization started, the rates of polymerization were prohibitively low for commercial operation. When the copolymeric product was devolatilized and examined it was found to be discolored badly and to have little thermal stability.

When the stainless steel pumps were again replaced, the polymerization rates and the product returned to that previously prepared.

Example 5

A kettle was fitted with a turbine-type agitator and with inlet and outlet tubes for introducing liquid monomeric materials and withdrawing fluid copolymer-monomer mixtures. Means were provided for pumping the materials into and out of the kettle. The kettle was jacketed for thermal control. All materials of construction which were in contact with the monomers or copolymers were of stainless steel.

The process of Example 1 was repeated in this apparatus. The results were found to be identical to those obtained with the coil apparatus of that example.

Example 6

Several copolymers were made in the apparatus of Example 1 and in accordance with that process. After devolatilization the polymeric materials were checked for heat distortion temperature and for fabrication temperature.

The term, "heat distortion temperature," for present purposes, should be construed as that temperature which results when a sample of specified dimensions is loaded in a prescribed manner and heated at a fixed rate until the sample is deformed to a stated value. Such a test method is described in A.S.T.M. Tentative Method of Test for Heat Distortion Temperature of Plastics (D-648-44T) in the 1944 Book of A.S.T.M. Standards, Part III, page 1627. A modification of that method is described in A.S.T.M. Bulletin No. 134, May 1945. In the modified test, a compression molded sample is cut into a test specimen having dimensions of 1.75 by 0.5 by 0.375 inch. The load is applied until a given deformation is obtained. The temperature at which that deformation results is considered to be the heat distortion temperature.

The fabrication temperature, for purposes of this example, is that temperature which is 25° F. above the temperature at which a mold will just fill when a ram pressure of 10,000 pounds per square inch is applied. For this example, a 1 oz. standard Watson-Stillman injection molding machine was used.

Figure 2:
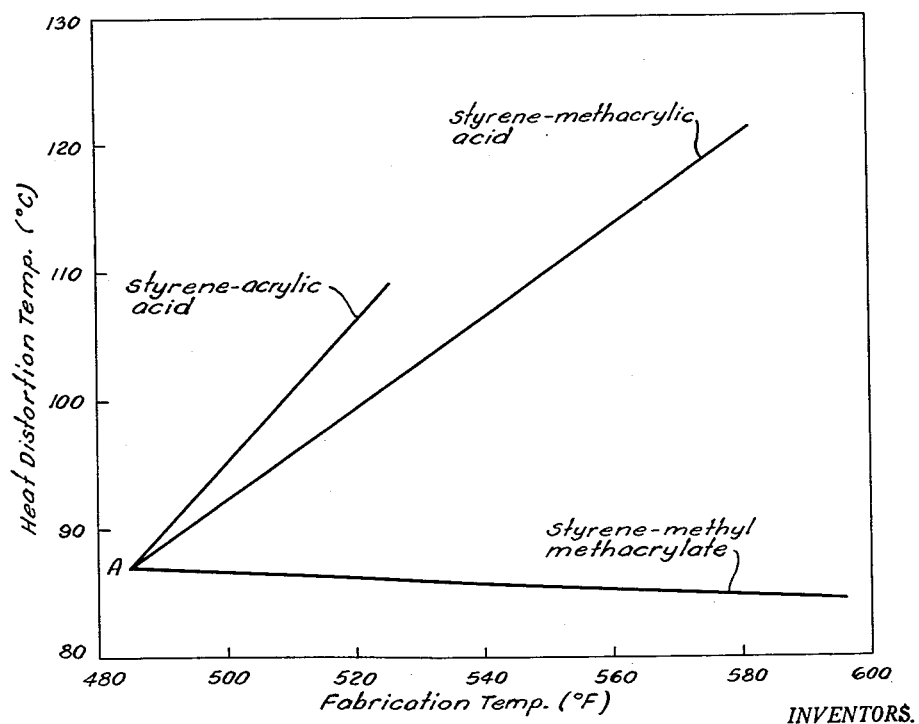
FIG. 2 is a plot of heat distortion temperature versus fabrication temperature and will be described in Example 6.

The heat distortion temperatures in degrees centigrade were plotted against the fabrication temperatures in degrees Fahrenheit. In the resulting plot, point A is polystyrene and the lines leading therefrom represent, in each case, a copolymer product with decreasing styrene content and a correspondingly increasing comonomer content. In all instances the result was found to be an essentially linear function with increasing acrylic monomer. These results are shown in the graph of FIGURE 2 of the hereto annexed drawing. The slope of the styrene-acrylic copolymer product is +1.25; that of the styrene-methacrylic acid copolymer product is +0.75; and that of styrene-methyl-methacrylate copolymer product is —0.45.

The significance of these results is of considerable commercial importance. With the copolymers of the present invention, it is possible to prepare articles having exceptional dimensional stability which can be fabricated on conventional apparatus at the usual temperature.

What is claimed is:

1. A process for preparing thermoplastic copolymers of molding grade comprising, as continuous steps (1) the preparation of a homogeneous monomeric material consisting essentially of a monovinyl aromatic monomer of the benzene series and from 1 to 30 percent by weight of said monomeric material of an unsaturated carboxylic acid selected from the group consisting of acrylic and methacrylic acids, (2) the exposure in a polymerization zone of a mixture of said homogeneous monomeric material and the copolymer product of polymerization thereof in the liquid state to a polymerization temperature between about 130° C. and about 160° C., the proportion of said copolymer product being not more than about 60 percent by weight of said mixture, (3) the maintenance of the proportions of said monomeric material and said copolymer product in said mixture substantially constant by feeding additional of said monomeric material to the mixture while withdrawing said mixture of copolymer product and unpolymerized monomers from said zone at about the same volumetric rate at which said monomeric material is being fed to said mixture, all of said steps being carried out in the substantial absence of iron, and finally (4) isolating said copolymer product from said mixture.

2. The process claimed in claim 1 wherein said continuous steps are in sequential order.

3. The process claimed in claim 1 wherein said monomeric material is fed into said polymerization zone at a rate to maintain the polymerization temperature substantially constant.

4. The process claimed in claim 1 wherein the proportion of said copolymer product in said polymerization zone is maintained constant at from about 15 to about 60 percent by weight of said mixture.

5. The process claimed in claim 1 wherein said polymerization step (2) is conducted at a pressure of from about 25 to 75 pounds per square inch gauge.

6. The process claimed in claim 1 wherein said copolymer product is isolated by devolatilization of said mixture.

7. The process claimed in claim 1 wherein said monovinyl aromatic monomer is styrene.

8. The process claimed in claim 1 wherein the concentration of iron in the system at any time does not exceed 10 parts per million.

References Cited in the file of this patent

UNITED STATES PATENTS

| | | |
|---|---|---|
| 2,420,330 | Shriver et al. | May 13, 1947 |
| 2,537,030 | Chaney | Jan. 9, 1951 |
| 2,537,334 | De Nie | Jan. 9, 1951 |
| 2,641,595 | Leary | June 9, 1953 |

(Other references on following page)

UNITED STATES PATENTS 2,675,370 Barrett _____ Apr. 13, 1954
2,727,884 McDonald et al. _____ Dec. 20, 1955

OTHER REFERENCES

Boundy-Boyer: Styrene, Its Polymers, Copolymers and Derivatives, pp. 865–866, 885–886, Reinhold (1952).

Tobolsky et al.: Organic Peroxides, pp. 95–103, Interscience (1954).

Schildknecht: Polymer Processes, Interscience (1956).

D'Alelio: Fundamental Principles of Polymerization, John Wiley, pp. 413–424, 434–5 (1952).